(12) United States Patent
Ding et al.

(10) Patent No.: US 11,345,854 B2
(45) Date of Patent: May 31, 2022

(54) LIQUID CRYSTAL DIELECTRIC APPLICABLE TO HIGH-FREQUENCY ELECTROMAGNETIC WAVE MODULATION, AND COMPONENT THEREOF

(71) Applicant: Jiangsu Hecheng Display Technology Co., Ltd., Yangzhong (CN)

(72) Inventors: Wenquan Ding, Yangzhong (CN); Zhenting Zhou, Yangzhong (CN); Panpan Wang, Yangzhong (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 0 days.

(21) Appl. No.: 17/272,416

(22) PCT Filed: Sep. 6, 2019

(86) PCT No.: PCT/CN2019/104657
§ 371 (c)(1),
(2) Date: Mar. 1, 2021

(87) PCT Pub. No.: WO2020/063295
PCT Pub. Date: Apr. 2, 2020

(65) Prior Publication Data
US 2021/0317369 A1 Oct. 14, 2021

(30) Foreign Application Priority Data
Sep. 29, 2018 (CN) .......................... 201811148106.0

(51) Int. Cl.
| G02F 1/1333 | (2006.01) |
| C09K 19/10 | (2006.01) |
| C09K 19/30 | (2006.01) |
| H01P 1/18 | (2006.01) |
| H01Q 3/36 | (2006.01) |

(52) U.S. Cl.
CPC .......... C09K 19/10 (2013.01); C09K 19/3068 (2013.01); H01P 1/18 (2013.01); H01Q 3/36 (2013.01)

(58) Field of Classification Search
CPC .... C09K 19/10; C09K 19/18; C09K 19/3068; C09K 2019/181; C09K 2019/183; C09K 2019/188; C09K 2219/11; G02F 1/1333
See application file for complete search history.

(56) References Cited

U.S. PATENT DOCUMENTS

| 4,874,543 | A * | 10/1989 | Yoshida ................. | C09K 19/42 |
| | | | | 252/299.61 |
| 9,605,204 | B2 * | 3/2017 | Manabe ................. | C09K 19/18 |
| 10,711,195 | B2 * | 7/2020 | Manabe ............. | C09K 19/3458 |
| 2004/0173775 | A1* | 9/2004 | Suermann ............ | C09K 19/586 |
| | | | | 252/299.66 |
| 2012/0182200 | A1 | 7/2012 | Manabe et al. | |

(Continued)

FOREIGN PATENT DOCUMENTS

| CN | 102510891 A | 6/2012 |
| CN | 103320143 A | 9/2013 |

(Continued)

*Primary Examiner* — Geraldina Visconti
(74) *Attorney, Agent, or Firm* — Hoffmann & Baron, LLP

(57) ABSTRACT

A liquid crystal dielectric applicable to high-frequency electromagnetic wave modulation has a clearing point of the liquid crystal dielectric higher than 110° C., a low-temperature storage temperature lower than −20° C., and an optical anisotropy greater than 0.35. The liquid crystal dielectric includes: one or more compounds selected by general formula I, which occupy 30-80% of the total weight of the liquid crystal dielectric, and one or more compounds selected by general formula II and/or general formula III, which occupy 20-70% of the total weight of the liquid crystal dielectric. The liquid crystal dielectric has good low-temperature stability, high dielectric anisotropy, a high phase width, appropriate rotary viscosity, appropriate optical anisotropy, low dielectric loss, and a low loss tangent, exhibits strong high-frequency electromagnetic wave tuning capability, is specifically suitable for electromagnetic wave modulation in microwave or millimeter wave areas, and has a good application prospect in liquid crystal phase shifters.

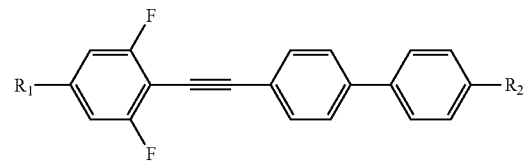

I

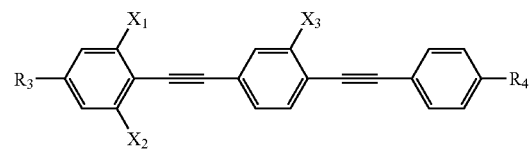

II

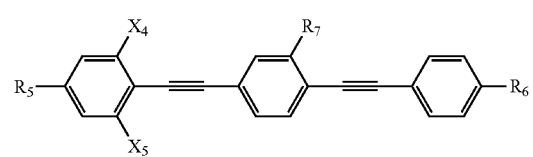

III

8 Claims, No Drawings

(56) References Cited

U.S. PATENT DOCUMENTS

2021/0317369 A1\* 10/2021 Ding ..................... H01Q 3/36

FOREIGN PATENT DOCUMENTS

| WO | WO 2013/139176 A1 \* | 9/2013 | ........... G02F 1/1333 |
|----|----|----|----|
| WO | 2018/077765 A1 | 5/2018 | |

\* cited by examiner

LIQUID CRYSTAL DIELECTRIC APPLICABLE TO HIGH-FREQUENCY ELECTROMAGNETIC WAVE MODULATION, AND COMPONENT THEREOF

CROSS-REFERENCE TO RELATED APPLICATIONS

This application is the National Stage of International Application No. PCT/CN2019/104657, filed Sep. 6, 2019, which claims the benefit of Chinese Application No. 201811148106.0, filed Sep. 29, 2018, the contents of which is incorporated by reference herein.

TECHNICAL FIELD

The present invention relates to the field of liquid crystal material, specifically to a liquid-crystalline medium capable of modulating high-frequency electromagnetic waves and the component thereof, which are particularly suitable for electromagnetic wave modulation in the microwave or millimeter wave region and can be specifically applied to liquid crystal phase shifters.

BACKGROUND ARTS

An antenna is a transducer that transforms a guided wave propagating on a transmission line into an electromagnetic wave propagating in an unbounded medium (usually free space), or vice versa, and thus as a component used in a radio device to transmit or receive electromagnetic waves. Engineering systems such as radio communication, broadcasting, television, radar, navigation, electronic countermeasures, remote sensing, radio astronomy, etc., all use electromagnetic waves to transmit information, relying on antennas to work.

Antenna has a special structural form, which can respond to certain wavelengths of electromagnetic waves in space, and form an induced current and transmit it to the receiver. The antenna is an indispensable part of the wireless communication field, and its basic function is to transmit and receive radio waves. When transmitting radio waves, the high-frequency current is converted into electromagnetic waves; when receiving radio waves, the electromagnetic wave is converted into high-frequency current.

Smart antennas refer to antenna arrays with smart signal processing algorithms that can be used to identify spatial signal signature such as the direction of arrival (DOA) of the signal, and use it for spatial filtering, to track and locate the signal source. The smart antenna used in the base station is an antenna array composed of multiple antenna units. Through the adjustment of the weighted amplitude and phase of each unit signal, the pattern of the array is changed to suppress interference and improve the signal-to-noise ratio. It can automatically detect the direction of the user and direct the beam to the user, so that the beam follows the user. The real meaning of smart antenna beam tracking is to form a high-gain narrow beam in the direction of the best path, to track the change of the best path, and to make full use of the effective transmission power of the signal to reduce electromagnetic interference.

Phase shifter is a core component of phased array radars and satellite communications, which can change the phase difference $\Delta\Phi$ between adjacent antennas, such that there is no need to rotate the antenna beam during spatial electrical scanning. The basic requirements for phase shifter mainly include: high phase shift accuracy, small volume and light weight, sufficient frequency band, power capacity and phase shift range, low insertion loss, stable performance, etc.

Most phased array systems are controlled by ferrite or diode phase shifters. Phase shifter is usually also called a phase switcher, and is a component often used in the microwave field with main function of changing the phase of the transmitted electromagnetic wave.

When the electromagnetic wave passes through a transmission line with a length of l, its phase at the output end will change accordingly. This phase change, namely the phase shift, can be expressed as:

$$\Delta\varphi = \beta l = 2\pi l / \lambda_g$$

in which, $$\lambda_\varepsilon = \frac{\lambda}{\sqrt{\varepsilon_r - (\lambda/\lambda_c)^2}},$$

$\Delta\varphi$ is the phase shift, $\beta$ is the phase shift constant, l is the length of the transmission line, $\lambda_g$ is the waveguide wavelength, $\lambda$ is the working wavelength, $\varepsilon_r$ is the dielectric constant, and $\lambda_c$ is the cutoff wavelength.

Sometimes, people are not satisfied with a fixed phase shift. In many cases, the phase of the electromagnetic wave is required to be adjustable within a certain range when the electromagnetic wave passes through the phase shifter, which is the main application value of the phase shifter. It is required that the phase shift generated by the electromagnetic wave can be adjusted when the electromagnetic wave passes through the phase shifter, but at the same time it is desired that no other additional influence is brought to the transmitted electromagnetic wave.

According to the above equation of $\Delta\varphi$, the change of phase shift $\Delta\varphi$ mainly depends on the change of electrical length $l/\lambda_g$ which can be achieved through two ways: changing the geometric length l of the transmission line; or changing the waveguide wavelength $\lambda_g$. The change of the waveguide wavelength $\lambda_g$ depends on the change of the dielectric constant $\varepsilon_r$ or the change of the cutoff wavelength $\lambda_c$. The phase shifter changes the cut-off wavelength of the wave by adjusting the effect of the equivalent dielectric constant on the wave propagation, thereby realizing the adjustment of the phase of the transmitted electromagnetic wave.

The phase shifter has the following key parameters:

(1) Phase Shift

The phase shift is proportional to the dielectric anisotropy. In order to obtain a large phase shift, a liquid crystal with a large dielectric anisotropy must be used. The preparation of a liquid crystal material with a high dielectric anisotropy is the key to produce liquid crystal phase shifters as mixed-crystals can achieve a high dielectric anisotropy.

(2) Insertion Loss

The thickness of the liquid crystal used in the liquid crystal display is only a few microns, and the thickness of the liquid crystal in the phase shifter reaches tens of microns. With the increase of the thickness of the liquid crystal layer, the effect of the calibration film on the liquid crystal becomes weaker, making the response time slower. One of the methods to reduce insertion loss is to increase the thickness of the liquid crystal layer. The mutual restriction between response time and insertion loss makes the insertion loss of the phase shifters currently manufactured to be generally higher. Therefore, an urgent problem to be solved is to improve the response time on the premise that the insertion loss is reduced.

(3) Unit Bandwidth

The maximum phase shift range and manufacturing tolerance sensitivity are indicators of the unit phase shift characteristics given at a specific frequency. In fact, when the operating frequency changes, the phase emitted by the unit will also change, therefore the frequency range where the change in the phase shift of the unit does not exceed a given value is defined as the unit bandwidth. The ideal phase shift characteristic curve with broadband characteristics is: at different frequencies within the operating frequency range, the phase shift characteristic curves are parallel to each other; when the frequency changes, the phase change is only a constant.

According to the material used in the phase shifter, the phase shifter can be divided into ferrite phase shifter, PIN diode phase shifter, MEMS (Micro Electro Mechanical System) phase shifter, arsenic Gallium MMIC (monolithic microwave integrated circuit) phase shifter, ferroelectric phase shifter, and recently appeared liquid crystal phase shifter, etc.

Liquid-crystalline medium has long been used in electro-optical displays to display information. However, in recent years, liquid-crystalline medium has been used in elements or components for microwave technology. The industrial application value of liquid-crystalline medium in high-frequency technology lies in that its dielectric properties can be controlled by a variable voltage (especially for the gigahertz range). The application of an electric field to the liquid crystal will make the dielectric constant parallel to the long axis of the liquid crystal molecule different from the dielectric constant perpendicular to the long axis of the molecule, and then the dielectric anisotropy appears. The above-mentioned properties enable the liquid-crystalline medium to be used in the phase shifter to construct a tunable antenna without any moving parts.

Phase shifter that uses the change of the dielectric anisotropy of the liquid-crystalline medium to achieve the purpose of phase shifting is a liquid crystal phase shifter, which has extremely high requirements for the phase temperature range, response speed, dielectric difference at high frequency, dielectric loss at high frequency, and drive voltage of the liquid-crystalline medium.

At present, there are some liquid-crystalline medium or liquid-crystalline composition suitable for high-frequency electronic wave modulation, but these liquid-crystalline medium generally have the following problems:

1. The phase shift range (tunability) under high frequency is not high;
2. The insertion loss at high frequency is excessive; and
3. The phase range is not enough and crystallization occurs at low or normal temperature, which limit the operating range of the phase shifter.

Therefore, further improving the high-frequency modulation performance of the existing liquid-crystalline medium, especially the use performance in the microwave or millimeter wave range, has become an urgent development direction for liquid crystal materials.

SUMMARY OF THE INVENTION

Object of the Invention

The object of the present invention is to provide a liquid-crystalline medium having a good low-temperature stability, a higher dielectric anisotropy, a wider phase range, an appropriate rotational viscosity, an appropriate optical anisotropy, an appropriate high-frequency dielectric constant, a lower dielectric loss and a smaller dielectric dissipation factor, the liquid-crystalline medium is suitable for high-frequency electromagnetic wave modulation, particularly an electromagnetic wave modulation for microwave and millimeter-wave regions, and can specifically be applied to liquid-crystal phase shifter in smart antenna.

Technical Solutions of the Present Invention

In order to achieve the above object, the present invention provides a liquid-crystalline medium having a clearing point of more than 110° C., a low-temperature storage temperature of below −20° C., and an optical anisotropy of more than 0.35, the liquid-crystalline medium comprising:

one or more compounds selected from the compounds of general Formula I in an amount of 30-80% of the total weight of the liquid-crystalline medium:

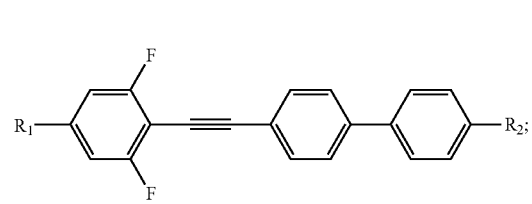

one or more compounds selected from the compounds of general Formula II and/or general Formula III in an amount of 20-70% of the total weight of the liquid-crystalline medium:

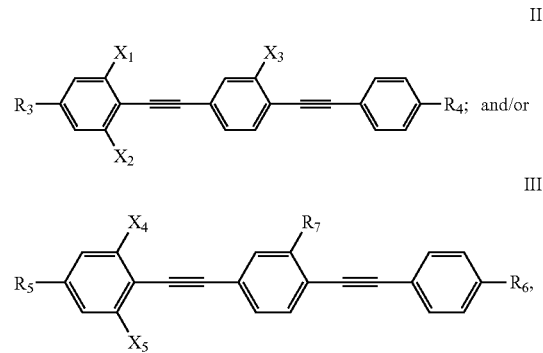

in which, $R_1$, $R_2$, $R_3$, $R_4$, $R_5$, $R_6$ and $R_7$ each independently represents $C_{1-12}$ alkane group,

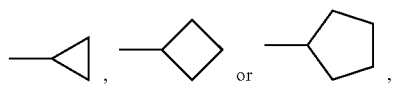

one or more than two nonadjacent —$CH_2$— in the alkane group can each be independently replaced by —CH=CH—, —C≡C—, —O—, —CO—, —CO—O— or —O—CO—, and one or more —H present in these groups can each be independently substituted by —F or —Cl; and $X_1 \sim X_5$ each independently represents —H, —F or —OCF$_3$, and at least two of $X_1$, $X_2$ and $X_3$ represents —F.

In some embodiments, $R_1$ and $R_2$ each is independently selected from a group consisting of —C$_2$H$_5$, —C$_3$H$_7$, —C$_4$H$_9$ and —C$_5$H$_{11}$.

In the preferred embodiments, relative to the total weight of the liquid-crystalline composition of the present invention, the lower limit of the content of the compound(s) of general Formula I is 31%, 32%, 33%, 34%, 35%, 36%, 37%, 38%, 39% or 40%; the upper limit of the content of the compound(s) of general Formula I is 78%, 75%, 72%, 70%, 68% or 65%.

In the preferred embodiments, the lower limit of the total content of the compound(s) of general Formula II and/or general Formula III is 21%, 22%, 23%, 24%, 25%, 26%, 27%, 28%, 29% or 30%, relative to the total weight of the liquid-crystalline medium of the present invention; the upper limit of the total content of the compound(s) of general Formula II and/or general Formula III is 68%, 65%, 62%, 60%, 58% or 55%, relative to the total weight of the liquid-crystalline composition of the present invention.

In some embodiments, the compound of general Formula II is selected from a group consisting of the following compounds:

II-1
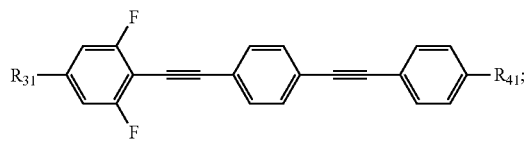

II-2
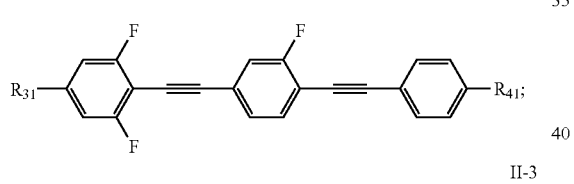

II-3
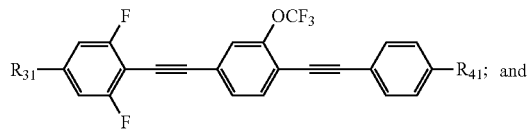

II-4
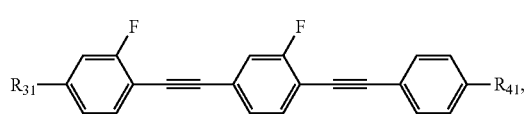

in which, $R_{31}$ and $R_{41}$ each independently represents C$_{2-6}$ alkane group,

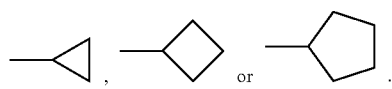

In some embodiments, the compound of general Formula III is selected from a group consisting of the following compounds:

III-1
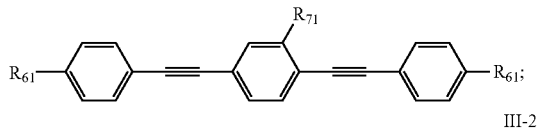

III-2
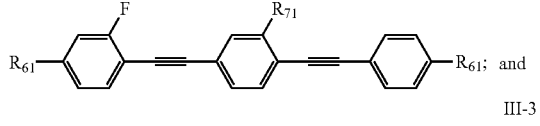

III-3
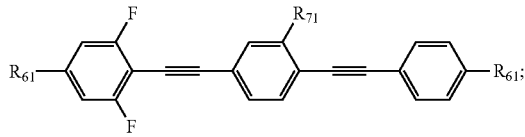

in which, $R_{51}$ and $R_{61}$ each independently represents C$_{2-6}$ alkane group,

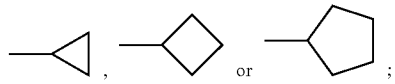

and $R_{71}$ represents C$_{1-5}$ alkane group,

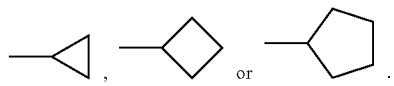

The liquid-crystalline medium of the present invention with a clearing point of more than 110° C., a low-temperature storage temperature of below −20° C. can meet the outdoor use requirements of phase shifters and other products; and the optical anisotropy thereof is greater than 0.35, which is beneficial to improve the high-frequency tunability of the liquid-crystalline medium. In the liquid-crystalline medium of the present invention, the components of general Formula I, general formula II and/or general formula III are beneficial to form a liquid-crystalline medium with a large optical anisotropy, a wide phase range, a low high-frequency dielectric loss and a high material quality.

In some embodiments, the liquid-crystalline medium comprises: one or more compounds selected from the compounds of general Formula I in an amount of 30-70% of the total weight of the liquid-crystalline medium, and one or more compounds selected from the compounds of general Formula II and/or general Formula III in an amount of 25-65% of the total weight of the liquid-crystalline medium.

In some embodiments, the liquid-crystalline medium comprises: one or more compounds selected from the compounds of general Formula I in an amount of 30-70% of the total weight of the liquid-crystalline medium, one or more compounds selected from the compounds of general Formula II in an amount of 1-40% of the total weight of the liquid-crystalline medium, and one or more compounds selected from the compounds of general Formula III in an amount of 1-40% of the total weight of the liquid-crystalline medium.

In some embodiments, the liquid-crystalline medium comprises: one or more compounds selected from the compounds of general Formula I in an amount of 30-70% of the total weight of the liquid-crystalline medium, one or more compounds selected from the compounds of general Formula II in an amount of 5-35% of the total weight of the liquid-crystalline medium, and one or more compounds selected from the compounds of general Formula III in an amount of 5-35% of the total weight of the liquid-crystalline medium.

In order to increase the dielectric anisotropy of the liquid-crystalline medium, improve the phase range of the liquid-crystalline medium and further improve the high-frequency dielectric loss and material quality of the liquid-crystalline medium, the liquid-crystalline medium can further comprise one or more compounds selected from the compounds of general Formula IV:

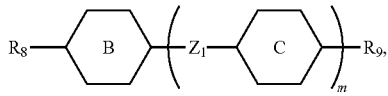

IV in which, $R_8$ represents $C_{4-12}$ alkane group, alkoxyl group, alkenyl group or alkenyloxy group;

$R_9$ represents —CN or —SCN;

Ring

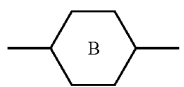

and ring

each independently represents

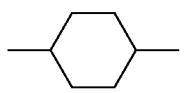

or

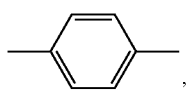

wherein one or more —CH$_2$— in

can be replaced by —O—, one or more single bonds in the ring can be replaced by double bond, one or more —H on

can be substituted by —CN, —F or —Cl, one or more —CH= in the ring can be replaced by —N=; and $Z_1$ represents single bond, —CF$_2$O—, —OCF$_2$—, —CO—O—, —O—CO— or —CH$_2$CH$_2$—;

m represents 1 or 2.

In some embodiments, the compound of general Formula IV is selected from a group consisting of the following compounds:

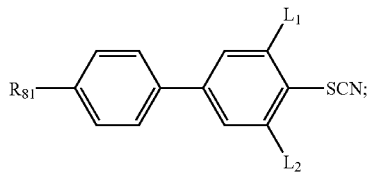

IV-1

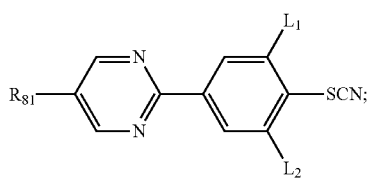

IV-2

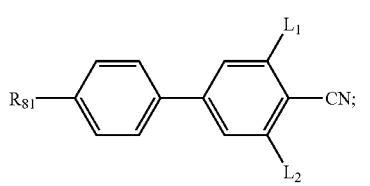

IV-3

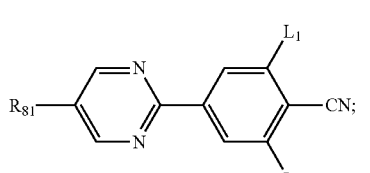

IV-4 and

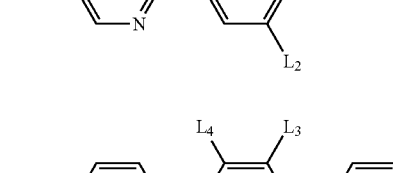

IV-5 in which, $R_{81}$ represents $C_{4-10}$ alkane group or alkoxyl group; and $L_1$, $L_2$, $L_3$ and $L_4$ each independently represents —H or —F.

In some embodiments, the liquid-crystalline medium comprises one or more compounds selected from the compounds of general Formula I in an amount of 30-70% of the total weight of the liquid-crystalline medium, one or more compounds selected from the compounds of general Formula II and/or general Formula III in an amount of 20-65% of the total weight of the liquid-crystalline medium, and one or more compounds selected from the compounds of general Formula IV in an amount of 1-25% of the total weight of the liquid-crystalline medium.

In the preferred embodiments, the lower limit of the total content of the compound(s) of general Formula IV is 2%, 3%, 4%, 5%, 6%, 7%, 8%, 9% or 10%, relative to the total weight of the liquid-crystalline medium of the present invention; the upper limit of the total content of the compound(s) of general Formula IV is 20%, 19%, 18%, 17%, 16% or 15%, relative to the total weight of the liquid-crystalline composition of the present invention.

In some embodiments, the liquid-crystalline medium can further comprise one or more compounds selected from the compounds of general Formula V:

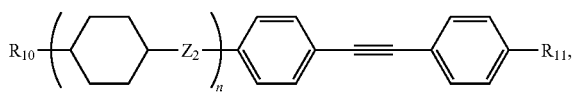

V in which, $R_{10}$ and $R_{11}$ each independently represents $C_{1-12}$ alkane group, alkoxyl group, alkenyl group or alkenyloxy group;
$Z_2$ represents single bond, —$CF_2O$—, —$OCF_2$—, —CO—O—, —O—CO— or —$CH_2CH_2$—; and
n represents 0 or 1.

In some embodiments, the compound of general Formula V is selected from a group consisting of the following compounds:

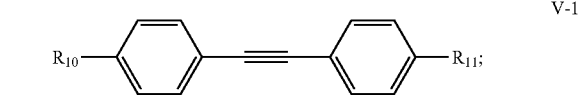

V-1

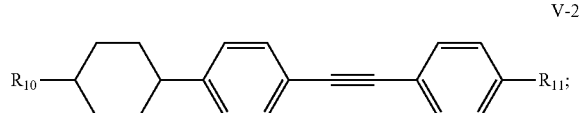

V-2

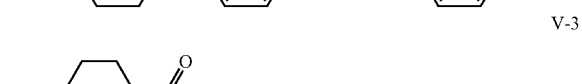

V-3

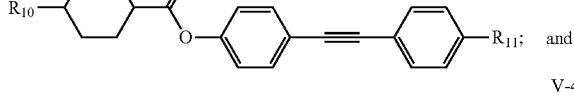

and

V-4

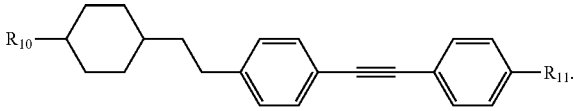

In some embodiments, the liquid-crystalline medium comprises one or more compounds selected from the compounds of general Formula I in an amount of 30-70% of the total weight of the liquid-crystalline medium, one or more compounds selected from the compounds of general Formula II and/or general Formula III in an amount of 20-65% of the total weight of the liquid-crystalline medium, and one or more compounds selected from the compounds of general Formula V in an amount of 1-25% of the total weight of the liquid-crystalline medium.

In some embodiments, the liquid-crystalline medium comprises one or more compounds selected from the compounds of general Formula I in an amount of 30-70% of the total weight of the liquid-crystalline medium, one or more compounds selected from the compounds of general Formula II and/or general Formula III in an amount of 20-65% of the total weight of the liquid-crystalline medium, one or more compounds selected from the compounds of general Formula IV in an amount of 1-25% of the total weight of the liquid-crystalline medium, and one or more compounds selected from the compounds of general Formula V in an amount of 1-25% of the total weight of the liquid-crystalline medium.

In some embodiments, the liquid-crystalline medium comprises one or more compounds selected from the compounds of general Formula I in an amount of 30-65% of the total weight of the liquid-crystalline medium, one or more compounds selected from the compounds of general Formula II and/or general Formula III in an amount of 25-60% of the total weight of the liquid-crystalline medium, one or more compounds selected from the compounds of general Formula IV in an amount of 5-20% of the total weight of the liquid-crystalline medium, and one or more compounds selected from the compounds of general Formula V in an amount of 1-20% of the total weight of the liquid-crystalline medium.

In some embodiments, the liquid-crystalline medium comprises one or more compounds selected from the compounds of general Formula I in an amount of 30-60% of the total weight of the liquid-crystalline medium, one or more compounds selected from the compounds of general Formula II and/or general Formula III in an amount of 25-60% of the total weight of the liquid-crystalline medium, one or more compounds selected from the compounds of general Formula IV in an amount of 5-20% of the total weight of the liquid-crystalline medium, and one or more compounds selected from the compounds of general Formula V in an amount of 1-20% of the total weight of the liquid-crystalline medium.

In the preferred embodiments, relative to the total weight of the liquid-crystalline composition of the present invention, the lower limit of the content of the compound(s) of general Formula V is 2%, 3%, 4%, 5%, 6%, 7%, 8%, 9% or 10%; the upper limit of the content of the compound(s) of general Formula V is 19%, 18%, 17%, 16% or 15%.

In some embodiments, the compound of general Formula II of the present invention is preferably selected from the compounds of general Formula II-2.

In some embodiments, the compound of general Formula III of the present invention is preferably selected from the compounds of general Formula III-3 and general Formula III-2.

In some embodiments, the compound of general Formula IV of the present invention is preferably selected from the compounds of general Formula IV-1, general Formula IV-3 or general Formula IV-5.

In some embodiments, the compound of general Formula V of the present invention is preferably selected from the compounds of general Formula V-1 or general Formula V-3.

The liquid-crystalline medium of the present invention can further comprise one or more additional additives, such as antioxidants, chiral dopants or UV stabilizer. Based on the total mixture, the total mass percentage concentration of these additional components is 10 ppm-10%, preferably 100 ppm-6%. The respective mass percentage concentration of an individual compound used is preferably 0.1%-3%.

In addition, additives used in the liquid-crystalline medium of the present invention, such as antioxidants and light stabilizers and the like, are preferably selected from the following substances.

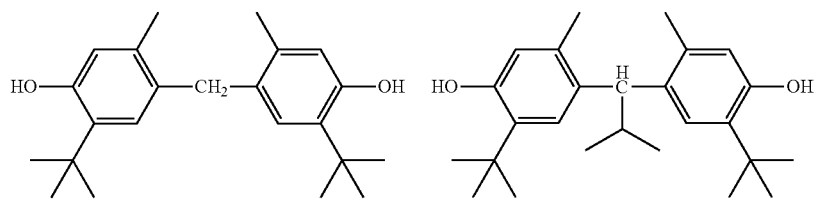
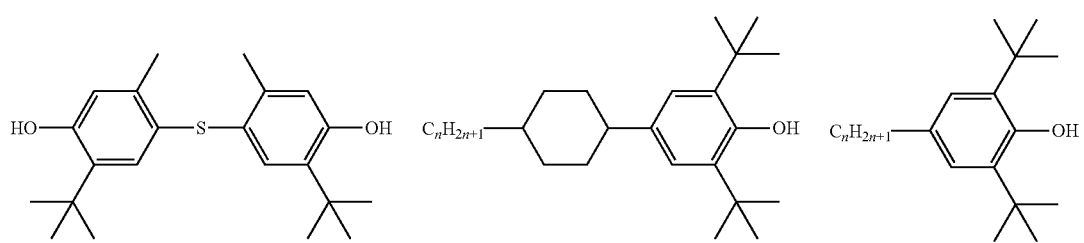
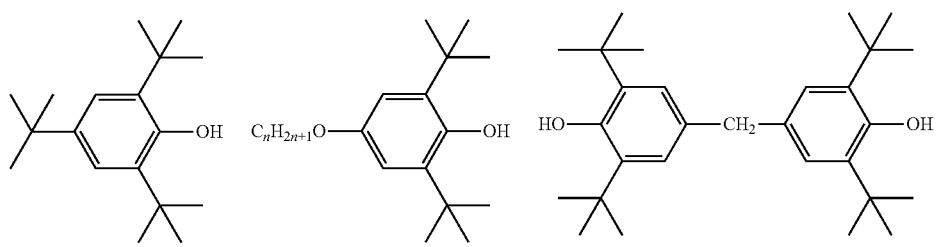
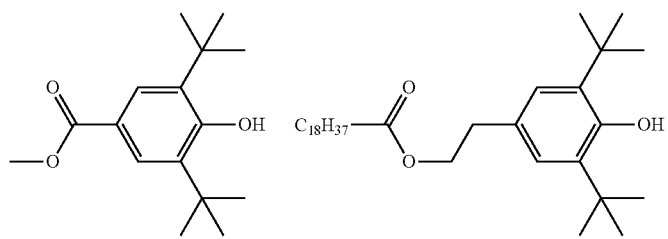
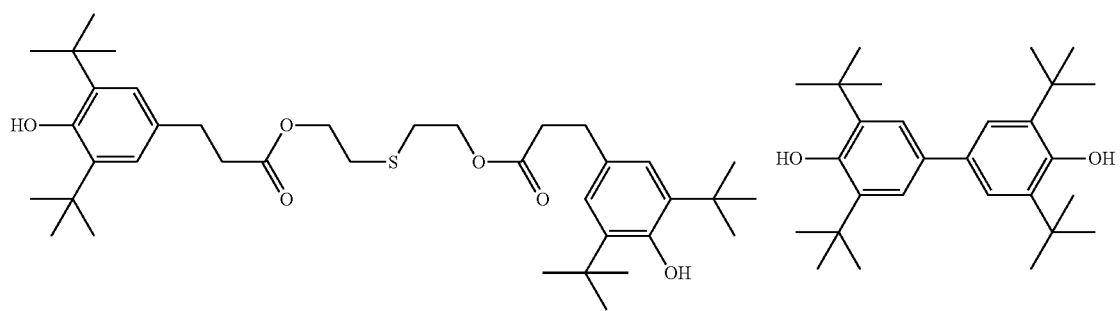

-continued
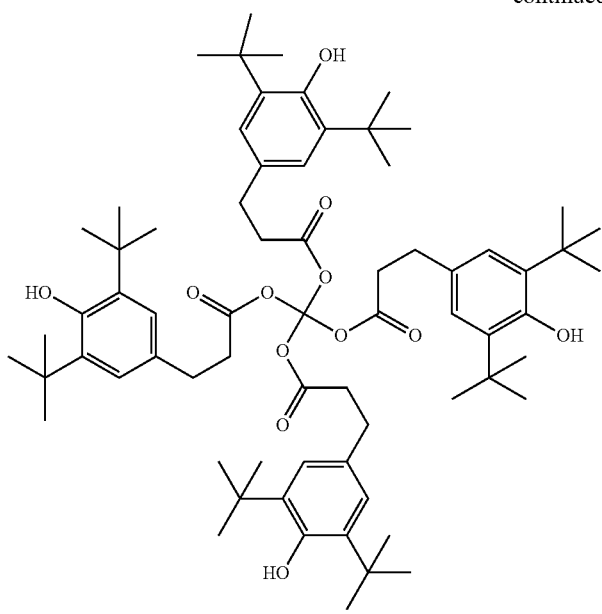
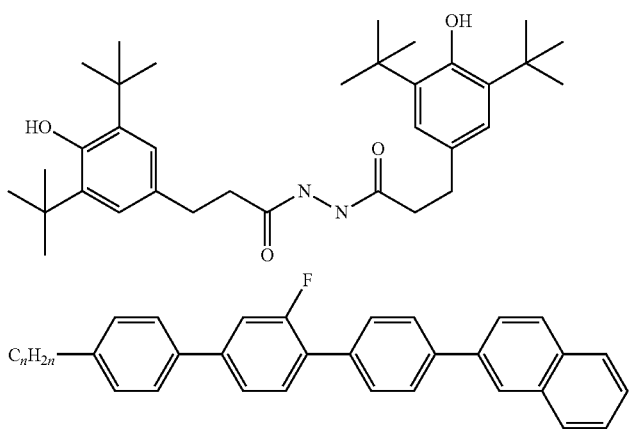
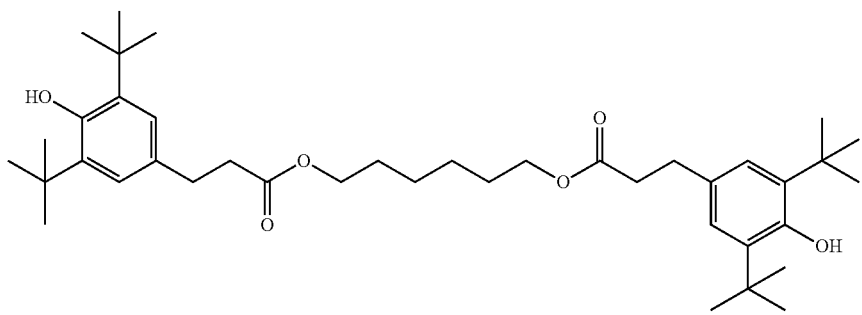
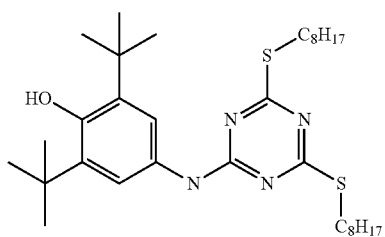

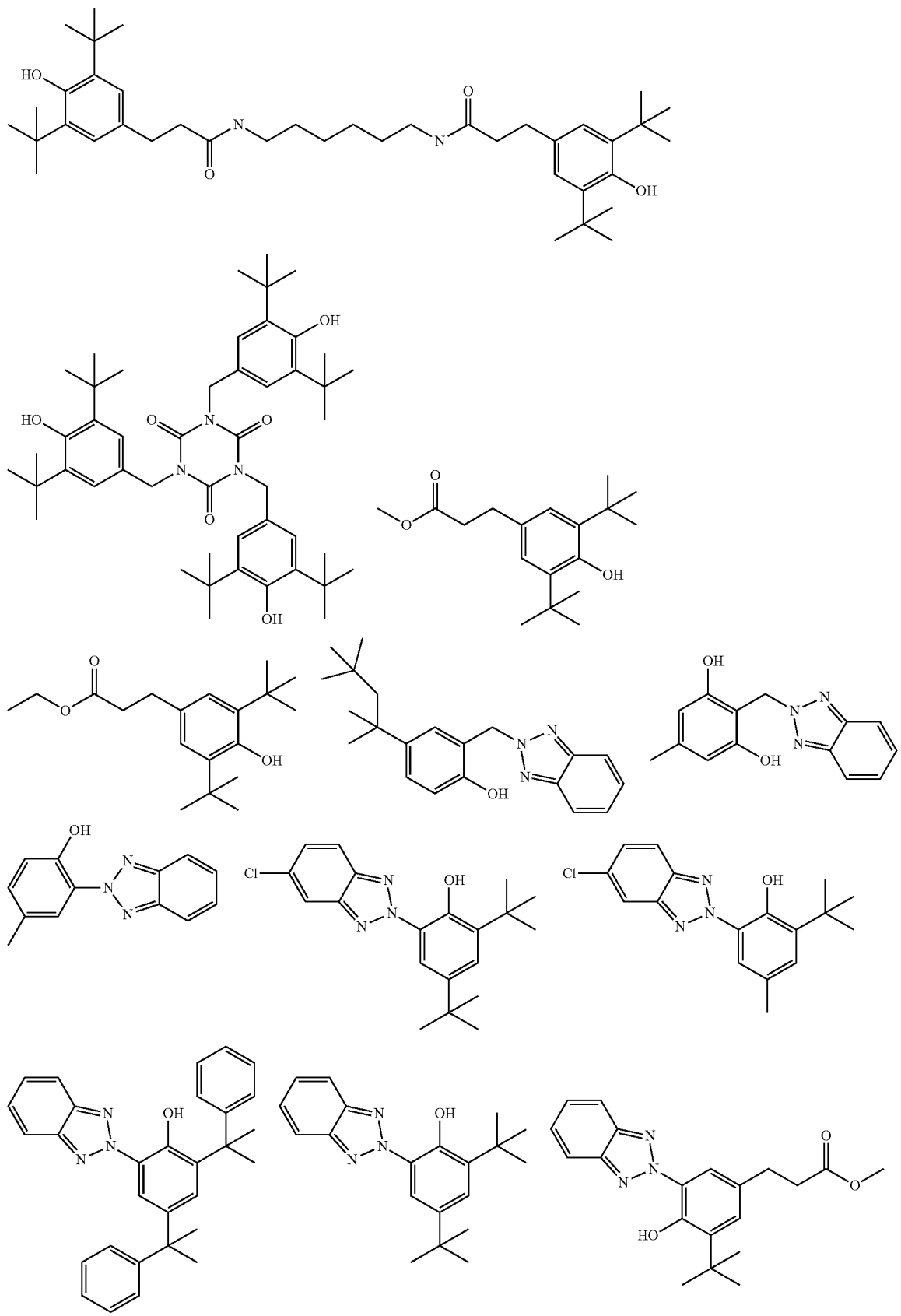

-continued

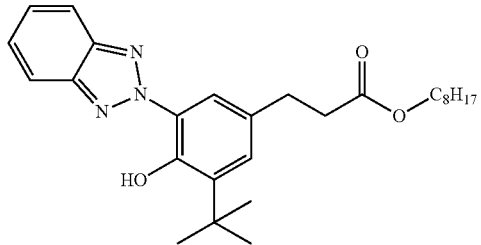
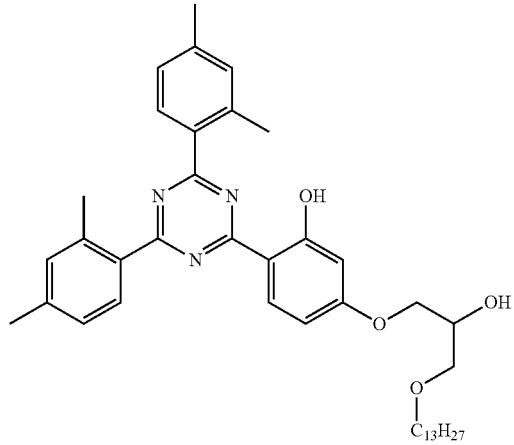
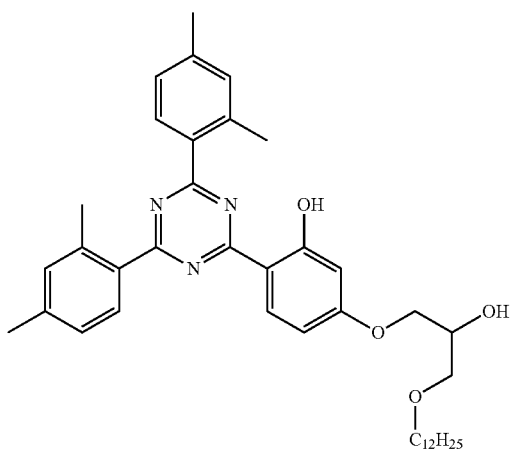
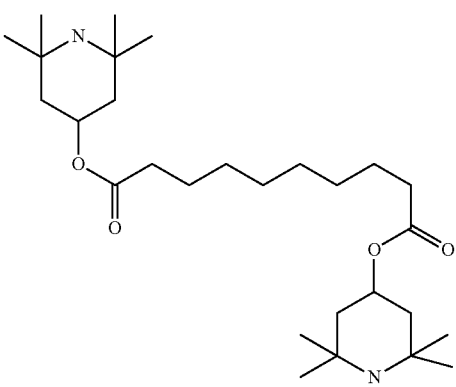
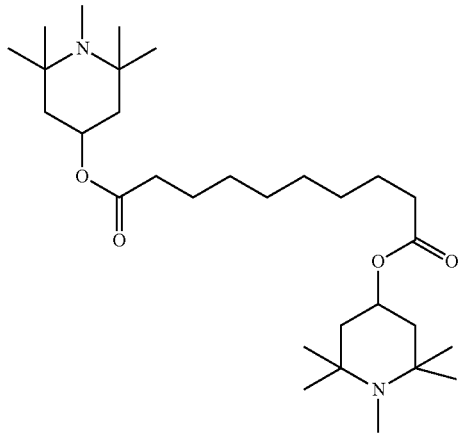

The present invention also provides a component for high-frequency technology comprising the above liquid-crystalline medium. The components used for high-frequency technology are particularly suitable for operations in the microwave or millimeter wave region.

Beneficial Effects

The liquid-crystalline medium of the present invention has a good low-temperature stability, a higher dielectric anisotropy, a wider phase range, an appropriate rotational viscosity, an appropriate optical anisotropy, an appropriate high-frequency dielectric constant, a lower dielectric loss and a smaller dielectric dissipation factor, exhibits a stronger tunability for high-frequency electromagnetic wave, particularly suitable for electromagnetic wave modulation within microwave or millimeter-wave region, and has good application prospects in liquid-crystal phase shifters

DETAILED EMBODIMENTS

The present invention will be illustrated by combining the detailed embodiments below. It should be noted that, the following examples are exemplary embodiments of the present invention, which are only used to illustrate the present invention, and not to limit it. Other combinations and various modifications within the conception of the present invention are possible without departing from the subject matter or scope of the present invention.

For the convenience of the expression, the group structures of the liquid-crystalline medium in each of the following Examples are represented by the codes listed in Table 1:

TABLE 1

| Codes of the group structures of liquid crystal compounds | | |
|---|---|---|
| Unit structure of group | Code | Name of group |
| (cyclohexyl) | C | 1,4-cyclohexylidene |
| (phenyl) | P | 1,4-phenylene |
| (F-phenyl) | G | 2-fluoro-1,4-phenylene |
| (2,6-diF-phenyl) | U | 2,6-difluoro-1,4-phenylene |
| (2,3-diF-phenyl) | W | 2,3-difluoro-1,4-phenylene |
| (pyrimidinyl) | M | 2,5-pyrimidinyl |
| $C_nH_{2n+1}$-phenyl | P(n) | 2-alkyl-1,4-phenylene |
| —$CH_2CH_2$— | 2 | ethyl bridge bond |
| —$OCF_3$ | OCF3 | trifluoromethoxy |
| —F | F | fluorine substituent |
| —Cl | Cl | chlorine substituent |
| —CN | N | cyano |
| —SCN | NCS | thiocyanato |
| —O— | O | oxygen substituent |
| —$CF_2O$— | 1(2F)O or Q | difluoro ether group |
| —$CH_2O$— | 1O | methyleneoxy |
| —COO— | E | ester bridge bond |
| —$C_nH_{2n+1}$ or —$C_mH_{2m+1}$ | n or m (n or m each represents a positive integer of 1-12) | alkyl |
| —CH═CH— or —CH═$CH_2$ | V | alkenyl |
| —C≡C— | T | acetenyl |

Take a compound with the following structural formula as an example:

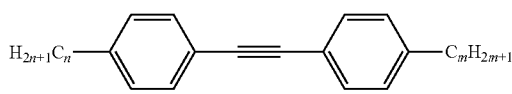

Represented by the codes listed in Table 1, this structural formula can be expressed as: nPTPm, n in the code represents the number of the carbon atoms of the alkyl on the left end, for example, n is "3", meaning that the alkyl is —$C_3H_7$; P in the code represents 1,4-phenylene, T in the code represents acetonyl, m represents the number of the carbon atoms of the alkyl on the right end, for example, m is "4", meaning that the alkyl is —$C_4H_9$.

The abbreviated codes of the test items in the following Comparative Example 2 and Examples 1-2 are as follows (the testing conditions of Comparative Example 1 can refer to the Reference Document in which it is contained):

Cp clearing point (nematic-isotropic phases transition temperature, ° C.)

LTS low-temperature storage temperature (° C.)

Δn optical anisotropy (589 nm, 25° C.)

ne extraordinary refraction index no ordinary refraction index

Δε dielectric anisotropy (1 KHz, 25° C.)

$\varepsilon_{//}$ parallel dielectric anisotropy (1 KHz, 25° C.)

$\varepsilon_{\perp}$ perpendicular dielectric anisotropy (1 KHz, 25° C.)

γ1 rotational viscosity (mPa·s, 25° C.)

in which, optical anisotropy is tested and obtained using Abbe refractometer under sodium lamp (589 nm) light source at 25° C.; and $\Delta\varepsilon = \varepsilon_{//} - \varepsilon_{\perp}$, in which, $\varepsilon_{//}$ is a dielectric constant parallel to the molecular axis, $\varepsilon_{\perp}$ is a dielectric constant perpendicular to the molecular axis, with the test conditions: 25° C., 1 KHz, VA type test cell with a cell gap of 6 μm.

Testing Method of High-Frequency Performances:

The liquid crystal is introduced into a polytetrafluoroethylene (PTFE) or fused silica capillary. The capillary has an internal radius of 180 μm and an external radius of 350 μm. The effective length is 2.0 cm. The filled capillary is introduced into the center of the cylindrical cavity with a resonance frequency of 19 GHz. This cavity has a length of 11.5 mm and a radius of 6 mm. The input signal (source) is then applied, and the result of the output signal is recorded using a commercial vector network analyzer. For other frequencies, the dimensions of the cavity can be adjusted accordingly.

The change in the resonance frequency and the Q factor between the measurement with the capillary filled with the liquid crystal and the measurement without the capillary filled with the liquid crystal is used to determine the dielectric constant as well as the dielectric loss and dielectric dissipation factor at the corresponding target frequency by means of equations 10 and 11 A. Penirschke, S. Müller, P. Scheele, C. Weil, M. Wittek, C. Hock and R. Jakoby: "Cavity Perturbation Method for Characterization of Liquid Crystals up to 35 GHz", 34th European Microwave Conference-Amsterdam, pp. 545-548, as described therein.

Comparative Example 1 (Example 1 of CN103842474B)

The liquid-crystalline medium with the formulation and properties as shown below in Table 2 is prepared.

TABLE 2

Formulation of the liquid-crystalline medium and its physical performances

| Code of component | Weight percentage | Physical performances | | |
|---|---|---|---|---|
| 4UTPP3 | 25.1 | Phase range | LTS | >0° C. |
| 4UTPP4 | 48.5 | (° C.) | Cp | 163.5 |
| 2UTPP3 | 26.4 | optical anisotropy | Δn | 0.4 |
| Total | 100 | (20° C., 589.3 nm) | ne | / |
| | | | no | / |
| | | Low-frequency dielectric anisotropy (1 KHz, 20° C.) | Δε | 1 |
| | | | $\varepsilon_{//}$ | 3.8 |
| | | | $\varepsilon_{\perp}$ | 2.8 |
| | | rotational viscosity (mPa · s, 20° C.) | γ1 | 310 |

Comparative Example 2

The liquid-crystalline medium with the formulation and properties as shown below in Table 3 is prepared.

TABLE 3

Formulation of the liquid-crystalline medium and its physical performance

| Code of component | Weight percentage | Physical performances | | |
|---|---|---|---|---|
| 2PTP6 | 2.5 | Phase range | LTS | −30 |
| 5PTPO1 | 2 | (° C.) | Cp | 103 |
| 4PTPO2 | 1 | optical anisotropy | Δn | 0.305 |
| 5PTPO2 | 1 | (25° C., 589 nm) | ne | 1.82 |
| 2UTPP3 | 4 | | no | 1.515 |
| 2UTPP4 | 17 | Low-frequency dielectric anisotropy (1 KHz, 25° C.) | Δε | 7.9 |
| 3UTPP2 | 4 | | $\varepsilon_{//}$ | 11.7 |
| 3UTPP4 | 12 | | $\varepsilon_{\perp}$ | 3.8 |
| 4UTPP3 | 20 | rotational viscosity (mPa · s, 25° C.) | γ1 | 246 |
| 3CEPTP5 | 3.5 | | | |
| 3CPO1 | 6 | | | |
| V2PEUN | 4 | | | |
| V2PTP2V | 15 | | | |
| 3MUN | 8 | | | |
| Total | 100 | | | |

The above liquid-crystalline medium is further incorporated with

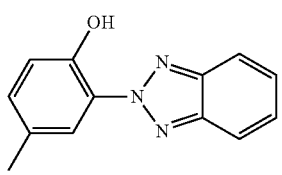 [SMILES: Cc1ccc(O)c(-n2nc3ccccc3n2)c1]

in an amount of 0.7% of the total weight of the liquid-crystalline medium.

Example 1

The liquid-crystalline medium with the formulation and properties as shown below in Table 4 is prepared.

TABLE 4

Formulation of the liquid-crystalline medium and its physical performance

| Code of component | Weight percentage | Physical performances | | |
|---|---|---|---|---|
| 3UTGTP2 | 8 | Phase range | LTS | −20 |
| 2UTPP3 | 5 | (° C.) | Cp | 160 |
| 2UTPP4 | 12 | | Δn | 0.3942 |
| 3UTPP2 | 10 | optical anisotropy | ne | 1.9076 |
| 3UTPP4 | 9 | (25° C., 589 nm) | no | 1.5134 |
| 4UTPP3 | 16 | Low-frequency dielectric anisotropy (1 KHz, 25° C.) | Δε | 2 |
| 3CEPTP5 | 3 | | $\varepsilon_{//}$ | 4.9 |
| 4UTGTP5 | 8 | | $\varepsilon_{\perp}$ | 2.9 |
| 3UTGTP5 | 8 | rotational viscosity (mPa · s, 25° C.) | γ1 | 280 |
| 3UTP(1)TP2 | 8 | | | |
| 4UTP(1)TP3 | 8 | | | |
| 7PGNCS | 5 | | | |
| Total | 100 | | | |

The above liquid-crystalline medium is further incorporated with

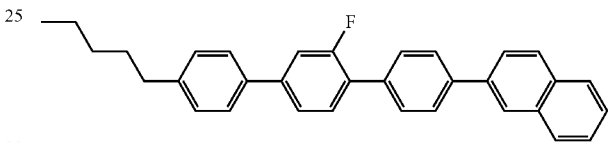

in an amount of 0.5% of the total weight of the liquid-crystalline medium, and

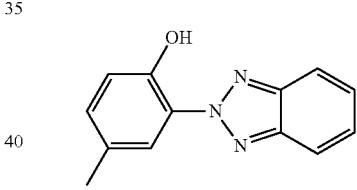

in an amount of 0.4% of the total weight of the liquid-crystalline medium.

Example 2

The liquid-crystalline medium with the formulation and properties as shown below in Table 5 is prepared.

TABLE 5

Formulation of the liquid-crystalline medium and its physical performance

| Code of component | Weight percentage | Physical performances | | |
|---|---|---|---|---|
| 3UTGTP2 | 4 | Phase range | LTS | −30 |
| 5PTPO1 | 6 | (° C.) | Cp | 131 |
| 4PTPO2 | 6 | optical anisotropy | Δn | 0.3672 |
| 2UTPP3 | 5 | (25° C., 589 nm) | ne | 1.8816 |
| 2UTPP4 | 5 | | no | 1.5144 |
| 3UTPP2 | 9 | Low-frequency dielectric anisotropy (1 KHz, 25° C.) | Δε | 3.2 |
| 3UTPP4 | 9 | | $\varepsilon_{//}$ | 6.2 |
| 4UTPP3 | 15 | | $\varepsilon_{\perp}$ | 3 |
| 4UTGTP5 | 4 | rotational viscosity (mPa · s, 25° C.) | γ1 | 242 |
| 3UTGTP5 | 5 | | | |

TABLE 5-continued

Formulation of the liquid-crystalline medium and its physical performance

| Code of component | Weight percentage | Physical performances |
|---|---|---|
| 5PPN | 5 | |
| NPGP3 | 4 | |
| 3UTP(1)TP2 | 5 | |
| 4UTP(1)TP2 | 5 | |
| 4UTP(1)TP3 | 5 | |
| V2PTP2V | 8 | |
| Total | 100 | |

The above liquid-crystalline medium is further incorporated with

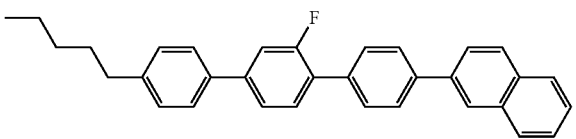 [SMILES: CCCCCc1ccc(-c2ccc(-c3ccc(-c4ccc5ccccc5c4)cc3)c(F)c2)cc1]

in an amount of 1% of the total weight of the liquid-crystalline medium, and

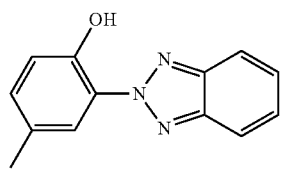 [SMILES: Cc1ccc(O)c(-n2nc3ccccc3n2)c1]

in an amount of 0.8% of the total weight of the liquid-crystalline medium.

The high-frequency performance test results of comparative Example 2 and Examples 1-2 are shown in Table 6 below.

(note: the liquid-crystalline medium of Comparative Example 1 crystallizes at room temperature, and therefore can not be tested for the following high-frequency performance)

TABLE 7

High-frequency performance test results

| High-frequency performances | Frequency | Comparative Example 2 | Example 1 | Example 2 |
|---|---|---|---|---|
| High-frequency dielectric constant | 10 GHz | 3.434 | 3.1 | 3.341 |
| | 15 GHz | 3.506 | 3.241 | 3.396 |
| | 25 GHz | 3.577 | 3.307 | 3.454 |
| Dielectric loss | 10 GHz | 0.0816 | 0.0416 | 0.0554 |
| | 15 GHz | 0.0796 | 0.0399 | 0.0532 |
| | 25 GHz | 0.0999 | 0.0452 | 0.0603 |
| Dielectric dissipation factor | 10 GHz | 0.0238 | 0.0125 | 0.0166 |
| | 15 GHz | 0.0227 | 0.0118 | 0.0157 |
| | 25 GHz | 0.0279 | 0.0131 | 0.0175 |

Based on the above test data, the following conclusions can be drawn:

From the comparison between Comparative Example 1 and Examples 1-2, it can be seen that the liquid-crystalline medium of the present invention has significantly better low-temperature stability, which can meet the outdoor use requirements of the phase shifter; and From the comparison between Comparative Example 2 and Examples 1-2, it can be seen that the liquid-crystalline medium of the present invention maintains substantially equivalent low-temperature stability and high-frequency dielectric constant, while having a lower dielectric loss and lower dielectric dissipation factor, as well as a larger optical anisotropy a better high-frequency electromagnetic wave tunability.

In conclusion, the liquid-crystalline medium of the present invention has a good low-temperature stability, a higher dielectric anisotropy, a wider phase range, an appropriate rotational viscosity, an appropriate optical anisotropy, an appropriate high-frequency dielectric constant, a lower dielectric loss and a smaller dielectric dissipation factor, and exhibits a stronger tunability for high-frequency electromagnetic wave.

The present invention can also be implemented by other various embodiments. Without departing from the spirit and essence of the present invention, the skilled person in the art can make various equivalent changes and modifications according to the present invention. However, these equivalent changes and modifications should fall within the protection scope of the appended claims of the present invention.

INDUSTRIAL APPLICABILITY

The liquid-crystalline medium involved with the present invention can be applied to the field of liquid crystal.

The invention claimed is:

1. A liquid-crystalline medium applicable to high-frequency electromagnetic wave modulation, wherein the liquid-crystalline medium having a clearing point of more than 110° C., a low-temperature storage temperature of below −20° C., and an optical anisotropy of more than 0.35, the liquid-crystalline medium comprising:

one or more compounds selected from the compounds of general Formula I in an amount of 30-80% of the total weight of the liquid-crystalline medium:

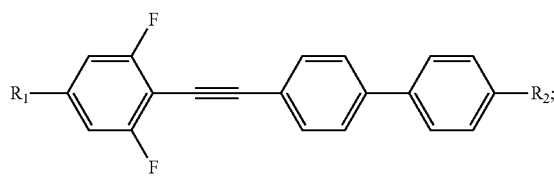

one or more compounds selected from the compounds of general Formula II and/or general Formula III in an amount of 20-70% of the total weight of the liquid-crystalline medium:

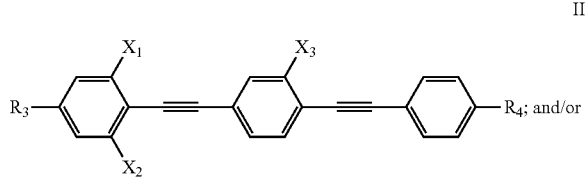

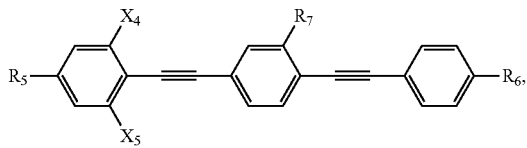

in which,

R$_1$, R$_2$, R$_3$, R$_4$, R$_5$, R$_6$ and R$_7$ each independently represents C$_{1-12}$ alkane group,

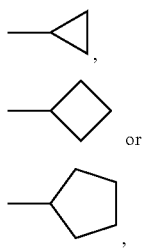

one or more than two nonadjacent —CH$_2$— in the alkane group can each be independently replaced by —CH=CH—, —C≡C—, —O—, —CO—, —CO—O— or —O—CO—, and one or more —H present in these groups can each be independently substituted by —F or —Cl; and X$_1$, X$_2$, X$_3$, X$_4$ and X$_5$ each independently represents —H, —F or —OCF$_3$, and at least two of X$_1$, X$_2$ and X$_3$ represents —F; and one or more compounds selected from a group consisting of the following compounds:

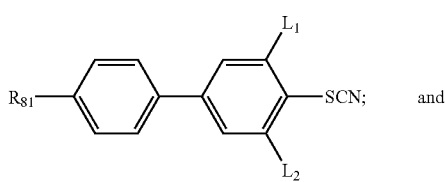

in which,

R$_{81}$ represents C$_{4-10}$ alkane group or alkoxyl group; and

L$_1$ and L$_2$ each independently represents —H or —F.

2. A liquid-crystalline medium according to claim 1, wherein R$_1$ and R$_2$ each independently selected from a group consisting of —C$_2$H$_5$, —C$_3$H$_7$, —C$_4$H$_9$ and —C$_5$H$_{11}$.

3. A liquid-crystalline medium according to claim 1, wherein the compound of general Formula II is selected from a group consisting of the following compounds:

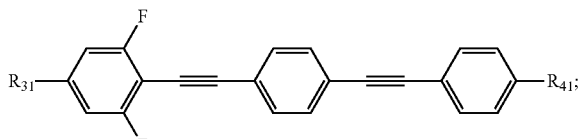

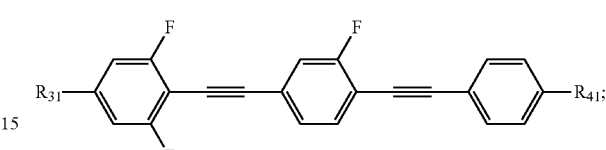

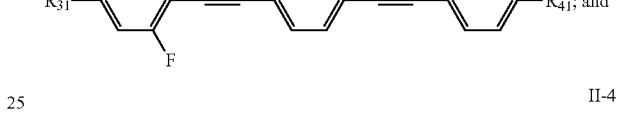

in which,

R$_{31}$ and R$_{41}$ each independently represents C$_{2-6}$ alkane group,

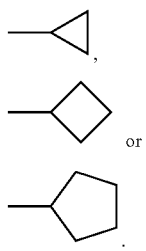

4. A liquid-crystalline medium according to claim 1, wherein the compound of general Formula III is selected from a group consisting of the following compounds:

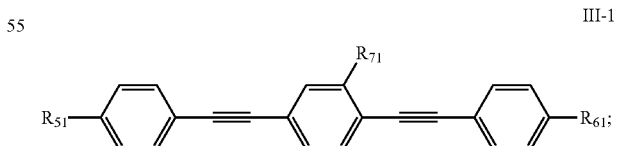

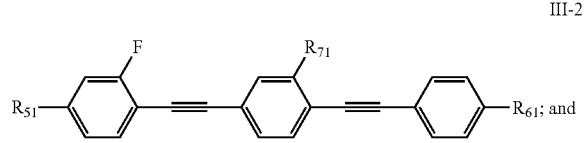

-continued

III-3

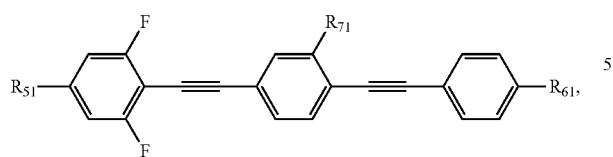

in which, $R_{51}$ and $R_{61}$ each independently represents $C_{2-6}$ alkane group,

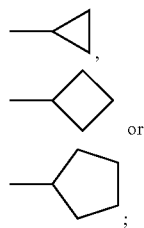

and $R_{71}$ represents $C_{1-5}$ alkane group,

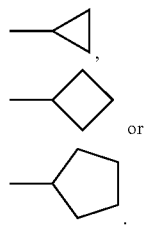

5. A liquid-crystalline medium according to claim 1, wherein the liquid-crystalline medium can further comprise one or more compounds selected from the compounds of general Formula V:

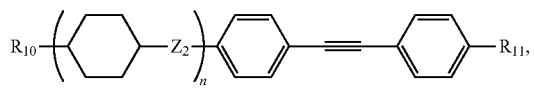

in which, $R_{10}$ and $R_{11}$ each independently represents $C_{1-12}$ alkane group, alkoxyl group, alkenyl group or alkenyloxy group;

$Z_2$ represents single bond, —$CF_2O$—, —$OCF_2$—, —CO—O—, —O—CO— or —$CH_2CH_2$—; and n represents 0 or 1.

6. A liquid-crystalline medium according to claim 5, wherein the compound of general Formula V is selected from a group consisting of the following compounds:

V-1

V-2

V-3 and

V-4 wherein $R_{10}$ and $R_{11}$ each independently represents C1-12 alkane group, alkoxyl group, alkenyl group or alkenyloxy group.

7. A liquid-crystalline medium according to claim 1, wherein the liquid-crystalline medium further comprises one or more additives.

8. A component for high-frequency technology, comprising the liquid-crystalline medium of claim 1.

* * * * *

UNITED STATES PATENT AND TRADEMARK OFFICE
CERTIFICATE OF CORRECTION

PATENT NO. : 11,345,854 B2  
APPLICATION NO. : 17/272416  
DATED : May 31, 2022  
INVENTOR(S) : Wenquan Ding et al.

Page 1 of 1

It is certified that error appears in the above-identified patent and that said Letters Patent is hereby corrected as shown below:

In the Claims

Claim 6 at Column 29, Line 35, should read as follows:

V-4

Signed and Sealed this  
Twentieth Day of September, 2022

Katherine Kelly Vidal  
*Director of the United States Patent and Trademark Office*